United States Patent
Klar et al.

(10) Patent No.: US 8,803,729 B2
(45) Date of Patent: Aug. 12, 2014

(54) MULTIBEAM RADAR SENSOR APPARATUS AND METHOD FOR DETERMINING A DISTANCE

(75) Inventors: Michael Klar, Magstadt (DE); Thomas Binzer, Ingersheim (DE); Klaus-Dieter Miosga, Backnang (DE); Oliver Brueggemann, Oelbronn-Duerrn (DE); Volker Gross, Ditzingen (DE); Joachim Hauk, Renningen-Malmsheim (DE); Elisabeth Hauk, legal representative, Renningen-Malmsheim (DE); Rahel Hauk, legal representative, Renningen-Malmsheim (DE); Manuel Hauk, legal representative, Renningen-Malmsheim (DE); Dirk Steinbuch, Wimsheim (DE); Goetz Kuehnle, Hemmingen (DE); Juergen Seiz, Welzheim (DE)

(73) Assignee: Robert Bosch GmbH, Stuttgart (DE)

( * ) Notice: Subject to any disclaimer, the term of this patent is extended or adjusted under 35 U.S.C. 154(b) by 485 days.

(21) Appl. No.: 13/262,768
(22) PCT Filed: Feb. 17, 2010
(86) PCT No.: PCT/EP2010/051950
§ 371 (c)(1),
(2), (4) Date: Jan. 3, 2012
(87) PCT Pub. No.: WO2010/112261
PCT Pub. Date: Oct. 7, 2010

(65) Prior Publication Data
US 2012/0105269 A1 May 3, 2012

(30) Foreign Application Priority Data
Apr. 1, 2009 (DE) .......................... 10 2009 002 082

(51) Int. Cl.
*G01S 13/00* (2006.01)
(52) U.S. Cl.
USPC .............................. 342/70; 342/109; 342/114

(58) Field of Classification Search
USPC ............................................ 342/70, 109, 114
See application file for complete search history.

(56) References Cited

U.S. PATENT DOCUMENTS

| 2003/0100285 | A1* | 5/2003 | Puglia ........................... 455/293 |
| 2003/0179129 | A1 | 9/2003 | Tamatsu et al. |
| 2005/0285776 | A1 | 12/2005 | Miosga et al. |

FOREIGN PATENT DOCUMENTS

| DE | 197199 53 | 11/1998 |
| DE | 10 2004 044 130 | 3/2006 |

(Continued)

OTHER PUBLICATIONS

International Search Report for PCT/EP2010/051950, dated May 16, 2010.

*Primary Examiner* — Timothy A Brainard
(74) *Attorney, Agent, or Firm* — Kenyon & Kenyon LLP

(57) ABSTRACT

In a multibeam radar sensor apparatus having at least two transmission/reception channels, whose signal paths each include an antenna and a mixer, at least one first mixer is configured bidirectionally as a transfer mixer, and at least one second mixer is switchable from a first into a second operating state; in the first operating state, the mixer is bidirectionally configured as a transfer mixer, and in the second operating state, the mixer being configured in an at least approximately isolating manner as a receiving mixer. In addition, in a method for determining a distance and/or a speed of a target, a radar signal is transmitted in a direction of the target and a reflected radar echo is received, for which at least two transmission/reception channels are used whose signal paths each include an antenna and a mixer; at least one mixture is switched over from a first into a second operating state, in order to use the mixer, in the first operating state, bidirectionally as a transfer mixture, and, in the second operating state, in an at least approximately isolating manner as a receiving mixer.

9 Claims, 3 Drawing Sheets

(56) References Cited

FOREIGN PATENT DOCUMENTS

| DE | 10 2005 062 772 | 7/2007 |
|----|----|----|
| DE | 10 2007 046 480 | 5/2008 |
| DE | 10 2007 035 026 | 1/2009 |
| DE | 10 2008 004 644 | 10/2010 |
| JP | 2006-80772 | 3/2006 |
| JP | 2007-218623 | 8/2007 |
| WO | WO 2006/010662 | 2/2006 |

* cited by examiner

MULTIBEAM RADAR SENSOR APPARATUS AND METHOD FOR DETERMINING A DISTANCE

FIELD OF THE INVENTION

The present invention relates to a multibeam radar sensor apparatus, e.g., having at least two transmission/reception channels, whose signal paths each include an antenna and a mixer, at least one first mixer being configured bidirectionally as a transfer mixer. In addition, the present invention relates to a method for determining a distance and/or a speed of a target, e.g., using a multibeam radar sensor apparatus, in which a radar signal is transmitted in a direction of the target and a reflected radar echo is received, for which at least two transmission/reception channels are used whose signal paths each include an antenna and a mixer; at least one first mixer being operated bidirectionally as a transfer mixer and the associated antenna being operated as both a transmitting and receiving antenna.

BACKGROUND INFORMATION

Certain multibeam radar sensor apparatuses are used, for example, in proximity radar warning systems or adaptive cruise control systems of motor vehicles. For example, using a multibeam radar sensor apparatus, an adaptive cruise control system may be implemented which controls the vehicle speed as a function of the speed of other road users.

To increase the spatial resolution of the multibeam radar sensor apparatus, DE 10 2004 044 130 describes the use of a plurality of parallelly positioned antennas, which each emit and receive a radar beam or a radar beam lobe. In this context, the emitting and the reception of the reflected radar signal is accomplished by one and the same antenna.

In addition, further antennas may be provided whose transmitting capacity is reduced or whose transmitting capacity may be completely dispensed with. These purely receiving antennas are normally situated at the edge regions of a multibeam radar sensor apparatus, in order to produce narrower, inner radar beam lobes. In this manner, the angular resolution is further improved and the adjacent-lane interference is reduced.

However, the above-mentioned measures cannot prevent targets having a large backscatter cross section from also being, detected in an angular range that is outside of the visual range of the sensor. Consequently, the proximity radar warning system and/or adaptive cruise control system in the motor vehicle is also influenced by objects, which, for example, could be passed safely in an adjacent lane. Furthermore, the angular resolution of the known multibeam radar sensor apparatuses is often not sufficient for clearly identifying false echoes as such, which occur due to reflections at buildings or roadway boundaries, and for suppressing them. Because of this, individual objects are often detected multiple times at different visual angles. This also results in spurious signals in the case of proximity radar warning, or in unwanted reactions of an adaptive cruise control system.

SUMMARY

Example embodiments of the present invention provide for preventing the detection of targets outside of a specifiable angular range. In addition, in the case of the detection of multiple echoes of a particular target, example embodiments of the present invention provide for unequivocally determining the position of the target.

Example embodiments of the present invention provide a multibeam radar sensor apparatus having at least two transmission/reception channels, whose signal paths each include an antenna and a mixer; at least one first mixer being configured bidirectionally as a transfer mixer, and at least one second mixer being switchable from a first into a second operating state; in the first operating state, the mixer being bidirectionally configured as a transfer mixer, and in the second operating state, the mixer being configured in an at least approximately isolating manner as a receiving mixer.

Furthermore, in a method for determining a distance and/or a speed of a target, using a multibeam radar sensor apparatus, a radar signal is transmitted in a direction of a target and a reflected radar echo is received, for which at least two transmission/reception channels are used whose signal paths each include an antenna and a mixer; at least one first mixer being operated bidirectionally as a transfer mixer and the associated antenna being used as both a transmitting and receiving antenna, and at least one second mixer being switched over from a first into a second operating state in order to use the mixer, in the first operating state, bidirectionally as a transfer mixer and to use the associated antennas as both transmitting and receiving antennas, and in order to use the mixer, in the second operating state, in an at least approximately isolating manner as a receiving mixer and to use the associated antenna mainly as a receiving antenna.

According to example embodiments of the present invention, it is provided that a multibeam radar sensor apparatus be produced by positioning a plurality of antennas in a fixed geometric relationship to each other. In stipulating the number of antennas used, one may weigh, in particular, the resolution that increases with the larger number of antennas against the space taken up and the increasing circuit expenditure. In particular, the number of antennas will often be two to ten. It is particularly preferable to use three or four antennas.

According to example embodiments of the present invention, at least one of these antennas is always used as a transmitting and receiving antenna. To that end, each of these antennas is connected to the high-frequency signal of a local oscillator via a transfer mixer. In this context, the transfer mixer is used for transmitting the signal generated by the local oscillator to the antenna, and, at the same time, for mixing the signal received by the antenna with the signal of the local oscillator. The mixed product is then an intermediate-frequency signal, whose frequency indicates the Doppler shift of the received signal. In this manner, the relative speed of the target may be determined, and, using the propagation time of the radar signal, the distance of the target may also be determined.

The remaining antennas are controlled via a mixer, which is switchable from a first and a second operating state. In the first operating state, the switchable mixer operates as a transfer mixer. In this manner, the antenna assigned to the mixer is used as a transmitting and receiving antenna, as already described above. On the other hand, in the second operating state, the mixer operates as an isolating mixer, which isolates the antenna from the signal of the local oscillator. The result of this is that the assigned antenna constitutes a pure receiving path. In this manner, both the transmission power and the radiation characteristic of the multibeam radar sensor apparatus may be varied. The reception characteristics of the multibeam radar sensor apparatus remain constant in the event of a change in the transmission characteristics. In this context, a nominally isolating mixer may also not provide ideal isolation, and a bridging signal may also allow an antenna connected as a pure receiving antenna to generate a transmission power. Nevertheless, this transmission power will be less than the transmission power coupled in via a transfer mixer and thereby influences the directional characteristic of the antenna device. With that, in the present context, an isolating mixer should be understood as a mixer that achieves an attenuation of the transmission signal of at least 10 dB, in particular, preferably greater than 30 dB.

Since both the major lobes and the minor lobes change upon switching into and switching away from transmission sources, the unambiguity range of the sensor may be increased by mutually validating the measured values in the case of at least two different directional characteristics of the transmitting antennas. In particular, one may change the radiation characteristic of the antenna arrangement, such that the regions in which the measured values are ambiguous do not overlap. In this manner, in the case of at least one radiation characteristic, a correct angle may be measured for each target.

In example embodiments of the present invention, it may be provided that the operating state of the second mixer be cyclically changed. In this manner, the entire measuring range of the multibeam radar sensor apparatus may be continuously illuminated and validated, using every available radiation characteristic, before measured values are output to the user or a post-connected control device.

In the following, example embodiments of the present invention shall be explained in more detail with reference to the figures.

DETAILED DESCRIPTION

Figure 1:
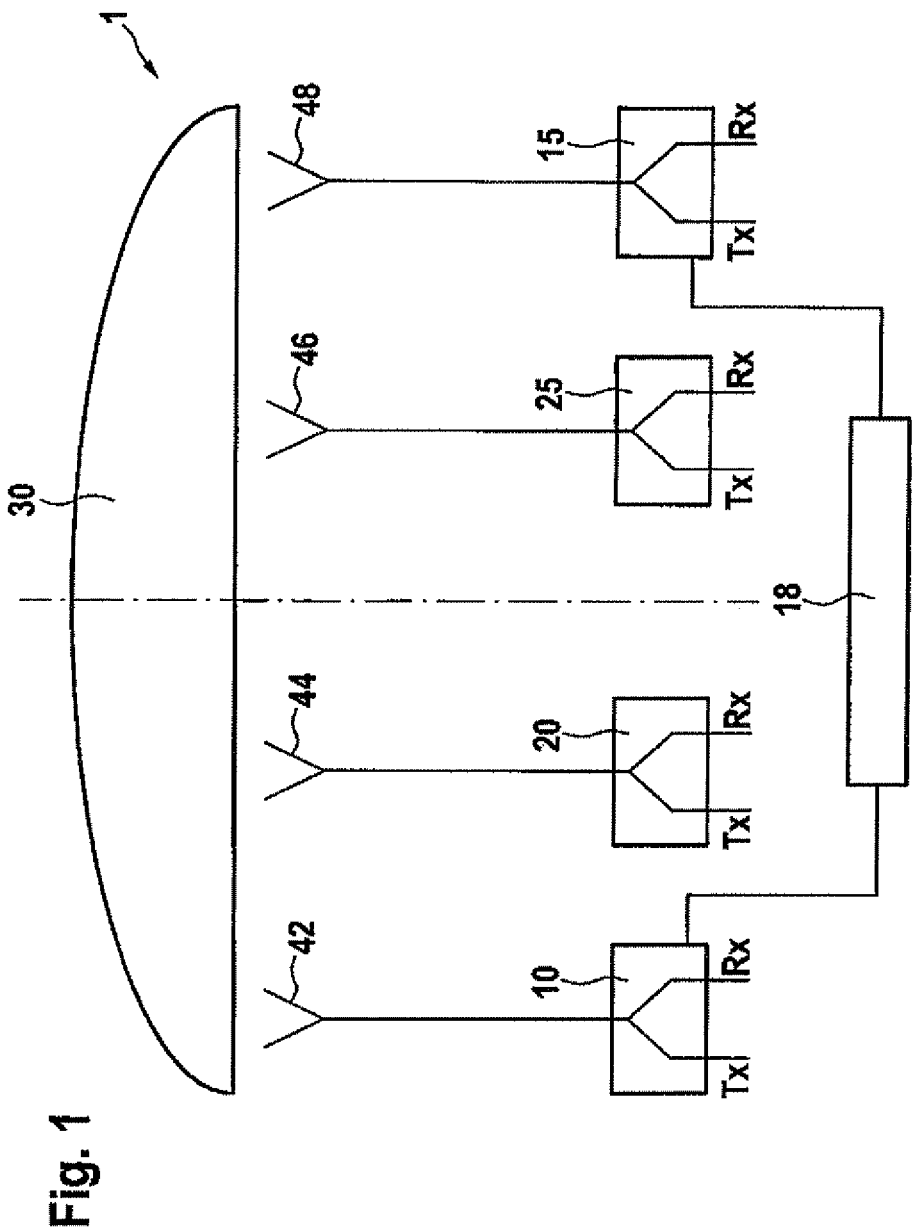
FIG. 1 illustrates the exemplary structure of a multibeam radar sensor apparatus having four antennas.

FIG. 1 shows a multibeam radar sensor apparatus according to an example embodiment of the present invention. The exemplary embodiment according to FIG. 1 uses four antennas 42, 44, 46, 48. In this context, multibeam radar sensor apparatus 1 uses a monostatic antenna arrangement, i.e., one and the same antenna may be used for both transmitting the radar signal and receiving the radar echo. To this end, each antenna 42, 44, 46, 48 is supplied a signal of a local oscillator via a mixer 10, 20, 25, 15 or output in the receiving mode.

The exemplary embodiment shown in FIG. 1 shows a multibeam radar sensor apparatus 1 having four linearly configured antennas 42, 44, 46, 48. Of course, the antennas may also be positioned in a different geometry, or a larger or smaller number of antennas may be used.

In the example embodiment shown, mixers 20 and 25 take the form of transfer mixers. Electric power from a local oscillator is supplied to the transfer mixers via an input Tx. The power supplied to mixer 20 is then at least partially routed to antenna 44 and, there, results in the emission of a radar beam or a radar radiation lobe. In the same manner, the electric power supplied to transfer mixer 25 is at least partially routed to antenna 46, and there, results in the emission of a radar beam.

Upon reception of a radar echo by one of antennas 44 or 46, the signal received by the antenna is supplied to transfer mixer 20 or 25. Transfer mixers 20 and 25 mix the received signal with the signal supplied by the local oscillator and provide, at output Rx, an intermediate frequency signal that information about the Doppler shift occurring during the reflection of the transmitted signal at the radar target.

In contrast to that, antennas 42 and 48 are connected to mixers 10 and 15, respectively, which are switchable from a first into a second operating state. In this context, in the first operating state, switchable mixers 10 and 15 operate as transfer mixers, as described in connection with mixers 20 and 25.

In the second operating state of mixers 10 and 15, these operate at least in an approximately isolating manner as receiving mixers. This means that the electric power of a local oscillator supplied at input Tx of mixers 10, 15 is not routed to corresponding antennas 42 and 48. Conversely, a radar signal received by antenna 42 is, however, mixed in mixer 10 with the signal generated in the local oscillator, which means that an intermediate frequency signal, from which the Doppler shift occurring during the reflection at the radar target may be determined, is provided, in turn, at output Rx. In the same manner, an intermediate frequency signal, which was generated from the received signal of antenna 48, is provided at output Rx of mixer 15.

In the second operating state, mixers 10 and 15 may not provide ideal isolation between input Tx of the local oscillator signal and the corresponding antenna output. Consequently, a reduced transmission power may also be output by antennas 42 and 48 in the second operating state.

Therefore, the transmission power of antennas 42 and 48 is influenced by the switching-over of mixers 10 and 15 from the first operating state into the second operating state. This changes the angular distribution of the radar beams emitted by multibeam radar sensor apparatus 1, and consequently, also the detection probability or the signal intensity at different receiving angles. By cyclically switching over mixers 10 and 15 using a switching device 18, the received signal may therefore be validated continuously, in order to detect, in this manner, false echoes of radar targets outside of the actual visual range of multibeam radar sensor apparatus 1 or multiple reflection of a single radar target.

In the exemplary embodiment shown, multibeam radar sensor apparatus 1 also has a lens 30, in order to adapt the angular range monitored by multibeam radar sensor apparatus 1 to a desired target range. However, it should be pointed out that lens 30 is optional and may also be omitted from other example embodiments.

Figure 2:
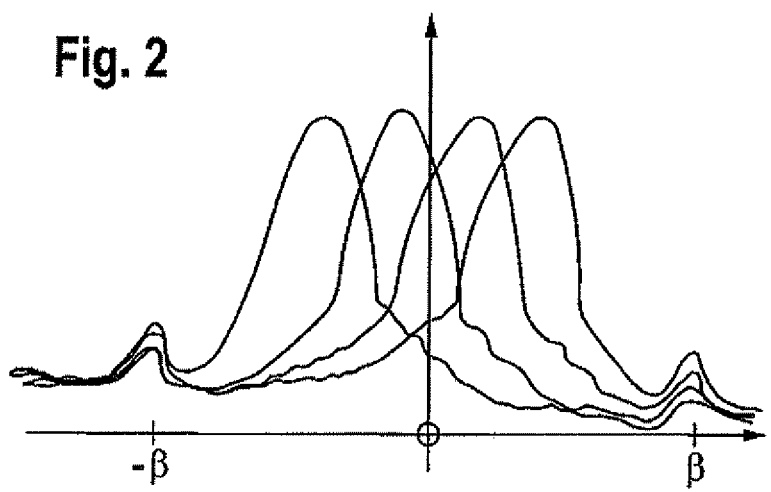
FIG. 2 shows the directional characteristic of the multibeam radar sensor apparatus represented in FIG. 1, in a first operating state.

FIG. 2 represents the directional characteristic of the multibeam radar sensor apparatus 1 represented in FIG. 1, in a first operating state. In this context, FIG. 2 shows the radar intensity emitted by each antenna 42, 44, 46, 48 on the ordinate and the corresponding transmission angle on the abscissa. In this instance, the ordinate of FIG. 2 coincides with the axis of symmetry of the apparatus represented in FIG. 1.

In the operating state shown, mixers 10, 20, 15 and 25 operate as transfer mixers. This means that the radar powers emitted by antennas 42, 44, 46, 48 are more or less identical. This is why the graph in FIG. 2 shows four major lobes of approximately equal height, as well as two minor lobes that occur at angles $\beta$ and $-\beta$.

Figure 3:
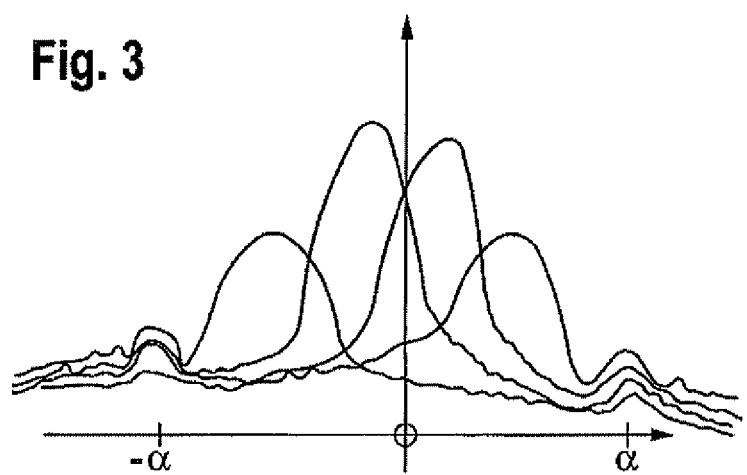
FIG. 3 shows the directional characteristic of the multibeam radar sensor apparatus represented in FIG. 1, in a second operating state.

FIG. 3 shows a graph identical to FIG. 2, after mixers 10 and 15 have been switched over from the first operating state into the second, isolating operating state. In this instance, FIG. 3 shows that the intensity emitted by antennas 44 and 46 remains nearly unchanged, since mixers 20 and 25 continue to operated as transfer mixers. Because of the non-ideal isolation of mixers 10 and 15, a transmission power, albeit a smaller one, continues to be emitted by antennas 42 and 48. In this manner, the illuminated visual range of multibeam radar sensor apparatus 1 is reduced. However, since mixers 10 and 15 continue to operate as receiving mixers, the receiving characteristics of multibeam radar sensor apparatus 1 remain unchanged.

The switching of the transmission power changes not only the major lobes, but also the minor lobes. In the exemplary embodiment shown, these now occur at angles α and −α. The antenna configuration is engineered such that angle α according to FIG. 3 is different from angle β according to FIG. 2. In this manner, the unambiguity range of the multibeam radar sensor apparatus may be increased. The switching-over of further mixers of other transmitting antennas may allow other angular distributions of the emitted radar beams to be produced. Furthermore, according to example embodiments of the present invention, more than two different directional characteristics may be generated by connecting different combinations of mixers.

Figure 4:
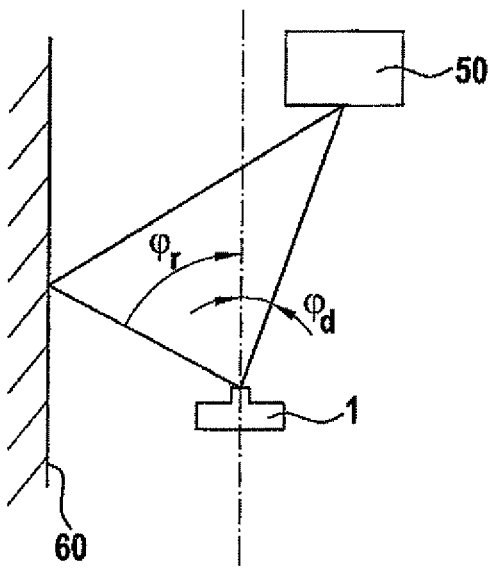
FIG. 4 shows the formation of multiple echoes by a single target.

FIG. 4 shows the use of a multibeam radar sensor apparatus 1 in a typical traffic situation. A detectable radar target 50, e.g., a vehicle driving ahead, is situated in front of multibeam radar sensor apparatus 1 at an angle $\phi_d$. In this context, the roadway is delimited on the left side by a guard rail or a tunnel wall 60. For the radar beams, this produces a further reflection path that, starting from radar target 50, leads to multibeam radar sensor apparatus 1 via guard rail 60. Consequently, multibeam radar sensor apparatus 1 detects an apparently present, second radar target at angle $\phi_r$.

Figure 5:
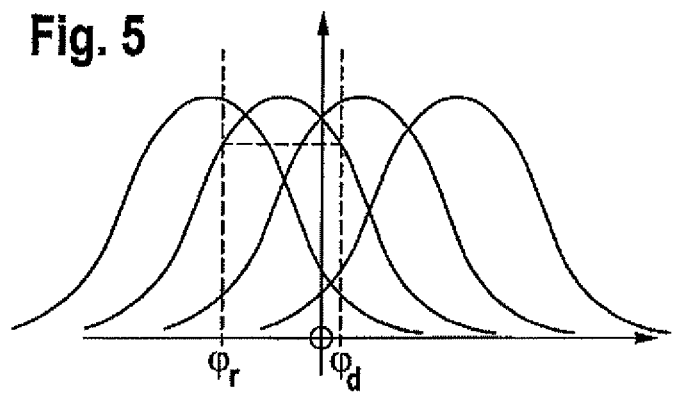
FIG. 5 clarifies the understanding of the situation represented in FIG. 4, in a first operating state of the multibeam radar sensor apparatus.

The measured values of multibeam radar sensor apparatus 1 obtained in the situation of application according to FIG. 4 are represented in FIG. 5. FIG. 5 shows, in turn, the intensity of the radar beams with respect to the angle. Furthermore, angles $\phi_d$ and $\phi_r$ at which the two supposed radar targets are picked up are marked in on the abscissa.

In the situation shown in FIG. 5, in which all four radar antennas operate in transmit mode in a manner analogous to FIG. 2, the transmission intensity is of equal value at the two angles $\phi_d$ and $\phi_r$. Accordingly, the two radar echoes received appear to be the same, and the situation represented in FIG. 4 is not unambiguously discernible.

Figure 6:
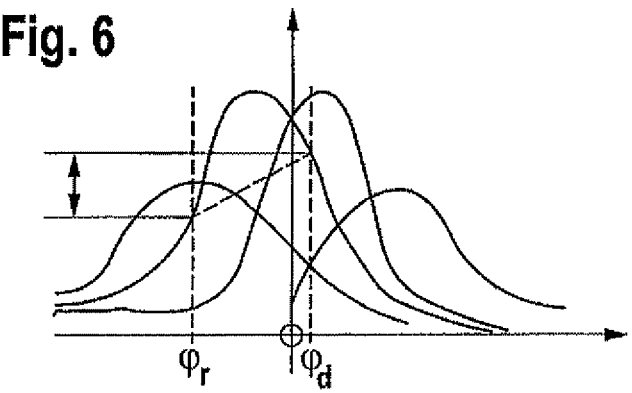
FIG. 6 clarifies the understanding of the situation represented in FIG. 4, in a second operating state of the multibeam radar sensor apparatus.

For purposes of validation, which allows differentiation between a radar target 50 having two reflection paths and two different radar targets, the transmission power of external antennas 42 and 48 is reduced as shown in FIG. 6. In this manner, the visual range illuminated by multibeam radar sensor apparatus 1 is reduced in size similarly to how a teleobjective of an optical photo camera renders this possible. Due to the reduction in intensity of the radar echo at angle $\phi_r$ with a uniform signal amplitude of the radar echo at angle $\phi_d$, which is apparent from FIG. 6, the echo detected at angle $\phi_r$ may be identified as a false echo or reflection, using an electronic circuit or software.

Of course, the exemplary embodiments shown and described herein should not be considered limiting. On the contrary, changes and modifications may be made. Accordingly, the above description is to be viewed not as limiting, but as exemplary.

What is claimed is:

1. A multibeam radar sensor apparatus, comprising:
   at least two transmission/reception channels, a signal path of each channel including an antenna and a mixer;
   wherein at least one first mixer is configured bidirectionally as a transfer mixer; and
   wherein at least one second mixer is switchable from a first into a second operating state, in the first operating state, the second mixer being bidirectionally configured as a transfer mixer, and in the second operating state, the second mixer being configured in an at least approximately isolating manner as a receiving mixer.

2. The apparatus according to claim 1, further comprising a switching device adapted to cyclically switch the operating state of the second mixer between the first operating state and the second operating state.

3. The apparatus according to claim 1, wherein a plurality of transmission/reception channels are arranged side-by-side, and the mixers of the signal paths are switchable between the first operating state and the second operating state.

4. A motor vehicle, comprising:
   a multibeam radar sensor apparatus according to claim 1.

5. An apparatus, comprising:
   at least one of (a) a proximity warning system and (b) an adaptive cruise control system, the at least one of (a) the proximity warning system and (b) the adaptive cruise control system including a multibeam radar sensor apparatus according to claim 1.

6. A method for determining at least one of (a) a distance and (b) a speed of a target using a multibeam radar sensor apparatus, comprising:
   transmitting a radar signal a direction of the target and receiving a reflected radar echo, for which at least two transmission/reception channels are used whose signal paths each include an antenna and a mixer;
   operating at least one first mixer bidirectionally as a transfer mixer and operating an associated antenna as both a transmitting and receiving antenna;
   switching over at least one second mixer from a first into a second operating state, in order to operate, in the first operating state, the second mixer bidirectionally as a transfer mixer and an associated antenna as both a transmitting and receiving antenna, and to operate, in the second operating state, the second mixer in an at least approximately isolating manner as a receiving mixer and the associated antenna mainly as a receiving antenna.

7. The method according to claim 6, further comprising cyclically switching the operating state of the second mixer between the first operating state and the second operating state.

8. The method according to claim 6, wherein a plurality of transmission/reception channels are arranged side-by-side, and the second mixers of external signal paths are switched between the first operating state and the second operating state.

9. The method according to claim 6, further comprising picking up and validating measured values in the first and in the second operating states of the second mixer.

* * * * *